(12) United States Patent
DeFelice et al.

(10) Patent No.: US 10,556,379 B2
(45) Date of Patent: *Feb. 11, 2020

(54) METHOD FOR PROCESSING PAEK AND ARTICLES MANUFACTURED FROM THE SAME

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/969,358

(22) Filed: May 2, 2018

(65) Prior Publication Data

US 2018/0243979 A1 Aug. 30, 2018

Related U.S. Application Data

(63) Continuation of application No. 13/705,332, filed on Dec. 5, 2012, now Pat. No. 10,000,022.

(Continued)

(51) Int. Cl.
*B29C 64/153* (2017.01)
*B33Y 10/00* (2015.01)
(Continued)

(52) U.S. Cl.
CPC .......... *B29C 64/153* (2017.08); *B29C 64/357* (2017.08); *B29C 67/04* (2013.01);
(Continued)

(58) Field of Classification Search
CPC ............ B29C 67/0066; B29C 67/0074; B29C 67/0051; B29C 67/0077; B29C 64/153;
(Continued)

(56) References Cited

U.S. PATENT DOCUMENTS

| | | |
|---|---|---|
| 4,710,562 A | 12/1987 | Maresca |
| 2006/0071359 A1 | 4/2006 | Monsheimer et al. |

(Continued)

FOREIGN PATENT DOCUMENTS

| | | |
|---|---|---|
| WO | 2005097475 A | 10/2005 |
| WO | 2011149101 A1 | 12/2011 |

OTHER PUBLICATIONS

International Search Report & Written Opinion of the International Searching Authority Application No. PCT/US2012/067855 Completed: Feb. 25, 2013; dated Mar. 13, 2013 7 pages.

(Continued)

*Primary Examiner* — Leith S Shafi
(74) *Attorney, Agent, or Firm* — Whitmyer IP Group LLC

(57) ABSTRACT

A process for manufacturing a three-dimensional object from a powder by selective sintering the powder using electromagnetic radiation. The powder includes recycled PAEK. In one embodiment, the powder includes recycled PEKK. In one embodiment, the powder includes first recycle PEKK and second recycle PEKK. In one embodiment, the powder consists essentially of recycled PEKK. The process may include the step of maintaining a bed of a selective laser sintering machine at approximately 300 degrees Celsius and applying a layer of the powder to the bed. The average in-plane tensile strength of the three-dimensional object is greater than that of a three-dimension object manufactured by selective sintering using a powder including an unused PEKK powder.

17 Claims, 1 Drawing Sheet

| | Unused PEKK | First Recycle PEKK | Second Recycle PEKK |
|---|---|---|---|
| Bed Temperature | ~ 285°C | ~ 300°C | ~ 300°C |
| Laser Exposure | ~ 2-50 WS/mm^2 | ~ 2-50 WS/mm^2 | ~ 2-50 WS/mm^2 |
| ASTM D638 | 13.5ksi with elongation to fail ~ 3.25% | 14.0ksi with elongation to fail of ~ 3.4% | 13.6ksi with elongation to fail of ~ 2.9% |

Related U.S. Application Data

(60) Provisional application No. 61/566,868, filed on Dec. 5, 2011.

(51) Int. Cl.

| | | |
|---|---|---|
| *C08G 65/40* | (2006.01) | |
| *B29C 67/04* | (2017.01) | |
| *B29C 64/357* | (2017.01) | |
| *B33Y 70/00* | (2020.01) | |
| *B33Y 40/00* | (2020.01) | |
| *B29K 71/00* | (2006.01) | |
| *B29K 105/26* | (2006.01) | |
| *B29C 35/08* | (2006.01) | |

(52) U.S. Cl.
CPC .......... *B33Y 10/00* (2014.12); *C08G 65/4012* (2013.01); *B29C 2035/0838* (2013.01); *B29K 2071/00* (2013.01); *B29K 2105/26* (2013.01); *B33Y 40/00* (2014.12); *B33Y 70/00* (2014.12); *C08G 2650/40* (2013.01)

(58) Field of Classification Search
CPC ............ B29C 67/04; B29C 2035/0838; C08G 65/4012; C08G 2650/40; B33Y 10/00; B33Y 40/00; B33Y 70/00; B29K 2071/00; B29K 2105/26
USPC ............... 425/174.4, 385, 174; 264/405, 497
See application file for complete search history.

(56) References Cited

U.S. PATENT DOCUMENTS

| | | |
|---|---|---|
| 2006/0118532 A1 | 6/2006 | Chung et al. |
| 2006/0134419 A1 | 6/2006 | Monsheimer et al. |
| 2011/0144752 A1 | 6/2011 | Defelice et al. |
| 2013/0065073 A1 | 3/2013 | Fuwa |

OTHER PUBLICATIONS

U.S. Office Action U.S. Appl. No. 13/705,332 dated Mar. 31, 2017, 16 pages.
U.S. Office Action U.S. Appl. No. 13/705,332 dated Sep. 28, 2017 19 pages.
U.S. Office Action U.S. Appl. No. 13/705,332 dated Jan. 28, 2016 13 pages.

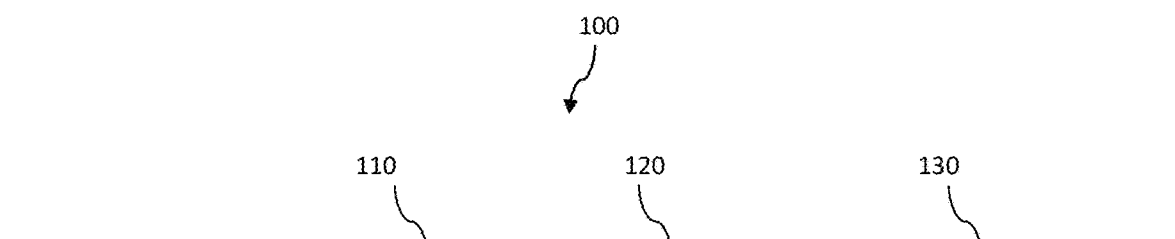

METHOD FOR PROCESSING PAEK AND ARTICLES MANUFACTURED FROM THE SAME

CROSS-REFERENCE TO RELATED APPLICATIONS

This application is a continuation of pending U.S. application Ser. No. 13/705,332 filed Dec. 5, 2012 which claims the benefit of U.S. Provisional Patent Application No. 61/566,868 filed on Dec. 5, 2011, the contents of which are incorporated herein by reference in their entirety.

TECHNICAL FIELD

The present disclosure relates to a method for processing polymer resins. More specifically, the present disclosure relates to a method in which selective laser sintering (SLS) is used to form a three-dimensional object from polyaryletherketones ("PAEK"). More specifically, the present disclosure relates to a method for performing selective laser sintering to form a three-dimensional object from a powder comprising recycled polyether ether ketone ketone ("PEKK").

BACKGROUND

Selective laser sintering ("SLS") is an additive manufacturing technique that uses electromagnetic radiation from a laser to fuse small particles of plastic, metal (direct metal laser sintering), ceramic, or glass powders into a mass that has a desired three dimensional object. The laser selectively fuses powdered material by scanning cross-sections generated from a 3-D digital description of the part on the surface of a powder bed. After a cross-section is scanned, the powder bed is lowered by one layer thickness, a new layer of material is applied, and the bed is rescanned. This process is repeated until the part is completed.

An SLS machine typically preheats the material in the powder bed to just below the melting point of the powder. This is typically accomplished by preheating the actual bed, which then transfers energy to the powder. The preheating of the powder makes it easier for the laser to raise the temperature of the selected regions of layer of unfused powder to the melting point. When working with polymer powders in the SLS process, the bed temperature is set to a temperature specific to the polymer resin in use. This specified temperature is typically close to the melting point of the resin. The laser causes fusion of the powder only in locations specified by the input. Laser energy exposure is typically selected based on the polymer in use and is between the amount required to melt the resin and the amount that will cause degradation. Preheating of the material inhibits unwanted distortions in formed parts as they cool.

After the layer-wise process is completed, the formed object(s) is in a cake of unfused powder, referred to as the cake. The formed object is extracted from the cake. The powder from the cake is recovered, sieved, and combined with unused powder and used in a subsequent SLS process. The extent that used polymer can be reused in a subsequent SLS processes is typically determined by the nature of the polymer itself. The ratio of recycled powder to unused powder is typically referred to as a recycle rate. The recycle rate of a specific polymer is typically determined by the vendor of that polymer. If the recycle rate is exceeded, the material properties of the built part can be degraded. The purpose of recycling powder in this way is to improve process economics. For example, in the case of Polyamide 11 (PA11) and other similar polymers, the recycle rate is typically below 33%. In other words, the ratio of used powder to unused powder cannot exceed 1 part recycled polymer to 2 parts unused polymer. Typically, the use of recycled powder is generally expected to degrade the material properties of parts sintered therefrom as compared to parts sintered entirely from an unused powder.

Polyaryletherketones ("PAEK") are of interest in the SLS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketone ketone ("PEKK"), polyetherketone ("PEK"), polyetheretherketoneketone ("PEEKK") or polyetherketoneetherketoneketone ("PEKEKK").

A disadvantage of parts manufactured from PAEK using the SLS process is that the strength a part comprising sintered PAEK is less than the strength of the same part comprising extruded PAEK or molded PAEK. It is known that the weakest aspect of objects made from the SLS process is the mechanical performance in the out-of-plane direction. This is also called the interlaminar or Z-axis. This collectively refers to the anisotropic nature of parts made by the SLS process, with the adhesion of the layers forming the part being the weakest link. The Z-axis performance can be markedly lower than the in plane (or XY).

Another disadvantage of PAEK materials is that they cannot be recycled for use in the SLS process. The only commercial supplier of a branded SLS PAEK powder has published that the recycle rate of its PAEK powders as 0%. It is known that use of recycled PAEK powder will cause degradation in the part.

SUMMARY

The present invention resides in one aspect in a process for manufacturing a three-dimensional object from a powder by selective sintering the powder using electromagnetic radiation. The powder comprises recycled PAEK.

In one embodiment, the powder comprises one or more of first recycle PEKK and second recycle PEKK. In yet another embodiment, the powder consists essentially of recycled PEKK. In yet another embodiment, the process includes the steps of maintaining a bed of a selective laser sintering machine at approximately 300 degrees Celsius and applying a layer of the powder to the bed. In yet further embodiments of the present invention, the average in-plane tensile strength of the three-dimensional object is greater than that of a three-dimensional object manufactured by selective sintering using electromagnetic radiation from a powder comprising an unused PEKK. In yet a further embodiment of the present invention, the average in-plane tensile strength of the three-dimensional object is greater than 10 ksi.

The present invention resides in another aspect in a three dimensional object comprising PAEK, the object being laser sintered from a composition comprising recycled PAEK powder.

In one embodiment, the composition comprises recycled PEKK powder. In yet another embodiment, the composition comprises one or more of first recycle PEKK and second recycle PEKK. In yet another embodiment, the composition consists essentially of recycled PEKK powder. In yet further embodiments of the present invention, the average in-plane tensile strength of the three-dimensional object is greater than an average in-plane tensile strength of a three-dimensional object being laser sintered from a composition comprising unrecycled PEKK powder. In yet other embodiments of the present invention, the average in-plane tensile strength of the object is greater than 10 ksi.

BRIEF DESCRIPTION OF THE DRAWINGS

FIG. 1 shows a chart illustrating a comparison between an SLS process using essentially unused PEKK, an SLS process using essentially first recycle PEKK, and an SLS process using essentially second recycle PEKK.

DETAILED DESCRIPTION

An SLS process performed on unused PEKK powders is generally as follows. First, an operator verifies that the unused powder is adequately dry. The unused powder is loaded into an SLS machine. Typically, the unused powder is loaded into a hopper, or the like, from which the SLS machine can distribute sequential layers of powder on to a bed of the SLS machine for sintering. It should be understood that there are different types of PEKK powder blends. Unlike other PAEK materials, PEKK is a copolymer (AB type EKK/EKK). The examples described herein pertain to the 60/40 PEKK blend unless otherwise noted. It should be understood, however, that the present invention is not limited to any specific blend of PEKK resin, and that different blends may be used.

Next, the part geometrics, also referred to as the build definition, is loaded into a computer associated with the SLS machine. It should be understood that the present disclosure is not limited to the specific sequence of steps described herein and that many different sequences of the disclosed steps may be apparent and used by a person of ordinary skill in the art. After the unused PEKK powder is loaded, the SLS machined is preheated according to known methods. The bed temperature is set to a temperature as specified by the vendor of the PEKK powder. The laser power is also set to a power specified by the vendor and/or to a power determined from earlier runs of the SLS process.

Using the above described PEKK, the bed temp is set to approximately 285 degrees Celsius and the laser power is set to approximately 30 (W*S/mm^2). A powder layer thickness of 125 microns is typical. After the layer-wise build is performed, the powder cake is allowed to cool at controlled rates. For example, for PEKK, the cake is typically cooled at between 1 and 100 degrees Celsius per hour. It should be appreciated by a person of ordinary skill in the art that the rate of cooling depends on the dimensions of the cake, with deeper beds typically requiring more time to cool.

When the cake has achieved near room temperature throughout, the built parts are removed therefrom. Typically, the mass yield from an SLS build using unused PEKK powder is less than 20% of the PEKK material required to form the cake bed in the initial build. In other words, the built parts account for approximately 20% of the PEKK material used in the build. The remaining PEKK material, approximately 80%, is not built into any part.

After the parts are removed from the cake bed, the remaining PEKK material is referred to as used PEKK material or recycled PEKK material. This material is referred to as used or recycled because it has been used at least once in the SLS process. In other words, this material has been raised to the bed temperature and added to the bed in a layer-wise fashion. Material adjacent to the used material was sintered in the initial SLS process.

After the parts are removed from the cake, the PEKK powder forming the cake is recycled for subsequent use in the SLS process. Sieving of the cake is performed to restore common size to the recovered cake structure, which is typically lumpy. The sieve size may be similar to the original powder or the sieve size may be different than the original powder. In the process described, it is preferred that the sieve size falls in the 20-200 micron range. It is possible to blend batches of used sieved PEKK powder. However, it is preferred that batches of used sieved PEKK powder that are blended have similar thermodynamic properties. The use of DSC, FTIR, and other analytical methods may be used to determine which batches of used sieved PEKK powder can be mixed. A test build can be used to validate analytical results.

The SLS process for recycled PEKK is described below. The correct bed temperature and laser power must be determined. In performing the SLS process using non-PAEK polymers, the same bed temperature and laser power are typically used on unused non-PAEK polymer and recycled non-PAEK polymer. Unlike the non-PAEK polymers, it has been discovered that the melting point of recycled PEKK is significantly higher than the melting point of unused PEKK. As a result, a different bed temperature is typically determined and used for recycled PEKK as compared to unused PEKK. Similarly, a different laser temperature is typically determined and used for recycled PEKK as compared to unused PEKK.

To determine the correct bed temperature for the recycled PEKK lot, the bed is set approximately 15 degrees Celsius below the melting temperature of unused PEKK material, as specified by the vendor. The temperature of the bed is increased in increments of one or two degrees Celsius while the SLS machine lays down a PEKK powder layer with each incremental temperature change. At some point, the bed provides a visual cue that indicates that under the current temperature the layers of PEKK powder are trying to fuse into a single block. For example the color of the bed and the texture of the bed shift, indicating that the layers of PEKK are trying to fuse into a single block. The bed temperature for a build using the recycled PEKK powder is usually 5 to 7 degrees Celsius below the temperature at which the layers of PEKK powder begin to fuse.

Next, the correct laser power for the recycled PEKK is determined. Different laser powers are searched to determine correct power. The laser power for a specific lot is determined by trying different powers to determine which power works best. Tests of dimensional accuracy and mechanical behavior on the sintered material are known and are common to establish the preferred laser settings for unused PEKK. After the bed temperature and laser power are determined for the recycled PEKK product, the SLS process is established and the desired objects are built using the process.

The inventor has discovered that the bed temperature and laser power for the recycled PEKK may be significantly higher than the known bed temperature and laser power for unused PEKK. For example, in an SLS process using essentially first recycle PEKK, the preferred bed temperature is approximately 300 degrees Celsius and the laser power is approximately 39 (W*S/mm^2). This compares to a bed temperature of approximately 285 degrees Celsius and a laser power of approximately 30 (W*S/mm^2) for an SLS process using a lot including essentially unused PEKK. It should be understood that the term first recycle PEKK refers to a batch of PEKK that has been previously used one time in the SLS process. The term second recycle PEKK, as used herein below, accordingly refers to a batch of PEKK powder that has previously been used twice. Although the disclosure refers to lots consisting of unused PEKK (also referred to as virgin PEKK), first recycle PEKK, and second recycle PEKK, the present invention is not so limited and many different blends may be used.

In an SLS process using a lot including essentially second recycle PEKK, the preferred bed temperature is approximately 300 degrees Celsius and the laser power is approximately 42 (W*S/mm^2).

Recycling of PEKK powders in SLS processes is achieved by using 100% used, unfused cake material. It is preferred to segregate used unfused SLS powders until appropriate mixing parameters are determined as described earlier.

It has been discovered that the parts made from the SLS process using recycled PEKK may be substantially more durable than parts made from the SLS processing using unused PEKK. For example, one test that is used to determine the strength of parts formed using the SLS process is the ASTM D638, which tests the tensile strength of the formed part. For example, in the case of an SLS process using a lot including essentially first recycle PEKK, the average in-plane tensile strength by ASTM D638 was 14.0 ksi with elongation to fail of ~3.4%. This compares to an in-plane tensile strength by ASTM D638 of 13.5 ksi with elongation to fail ~3.25% for a part formed using the SLS process with essentially unused PEKK.

In reference to FIG. 1, a chart 100 illustrates a comparison between an SLS process using essentially unused PEKK 110, an SLS process using essentially first recycle PEKK 120, and an SLS process using essentially second recycle PEKK 130. The layer thickness was approximately 125 microns in each case. The data in the chart represents approximate averages based on approximately 120 different test runs.

Although the present invention has been illustrated using recycled PEKK material, the present invention is not so limited and may be employed to perform the SLS process on any recycled PAEK material. In particular, the process disclosed herein may be used to perform the SLS process on materiel from the group consisting of polyetheretherketone (PEEK), polyetherketoneketone (PEKK), polyetherketone (PEK), polyetheretherketoneketone (PEEKK) or polyetherketoneetherketoneketone (PEKEKK).

Although the present invention has been illustrated with lots consisting essentially of 100% unused PAEK material, 100% first recycle PAEK material, or 100% second recycle material, the present invention is not so limited. It is possible to blend a recycled PAEK material with an unused PAEK material, or, for example, it is possible to blend a first recycled material with a second recycled material. It should be understood that the number of recycles can be greater than two.

Although the present invention has been disclosed and described with reference to certain embodiments thereof, it should be noted that other variations and modifications may be made, and it is intended that the following claims cover the variations and modifications within the true scope of the invention.

What is claimed is:

1. A layer-by-layer process for manufacturing a three-dimensional object from a powder comprising the steps of:
   applying a layer of a powder on a bed of a laser sintering machine, the powder comprising recycled polyetherketoneketone (PEKK) and unused PEKK;
   solidifying selected points of the applied layer of powder by irradiation;
   successively repeating the step of applying the powder and the step of solidifying the applied layer of powder until all cross sections of a three-dimensional object are solidified;
   wherein the unused PEKK is a PEKK powder that has not been used in a selective laser sintering (SLS) process;
   wherein the recycled PEKK is a PEKK powder that has been previously used in an SLS process having a bed temperature between a melting point temperature of the PEKK powder before the SLS process ($T_{M1}$) and 20 degrees Celsius less than the $T_{M1}$ and having a laser with a power between 2 and 50 (W*s/mm^2);
   wherein a melting point temperature of the recycled PEKK ($T_{M2}$) is greater than $T_{M1}$.

2. The process of claim 1, wherein a bed temperature of the powder comprising the recycled PEKK and the unused PEKK ($T_{Bed}$) is greater than a bed temperature for the unused PEKK.

3. The process of claim 2, further comprising the step of:
   maintaining the bed of the laser sintering machine at $T_{Bed}$, wherein $T_{Bed}$ is approximately 285 degrees Celsius or greater.

4. The process of claim 3, wherein $T_{Bed}$ is approximately 300 degrees Celsius.

5. The process of claim 2, further comprising steps of preparing the recycled PEKK powder by:
   applying a layer of a unused powder on a bed of a laser sintering machine, the unused powder comprising unused PEKK and excluding recycled PEKK;
   subjecting the unused powder to a bed temperature between a melting point temperature of the unused powder before the SLS process ($T_{MV}$) and 20 degrees Celsius less than the $T_{MV}$;
   solidifying selected points of the applied layer of unused powder by irradiation via a laser with a power between 2 and 50 (W*s/mm^2);
   successively repeating the step of applying the unused powder and the step of solidifying the applied layer of unused powder until all cross sections of a three-dimensional object are solidified;
   forming the recycled powder by collecting the unsolidified unused powder used in the successive steps of applying unused powder and solidifying unused powder.

6. The process of claim 5, further comprising the steps of:
   forming the powder by combining the recycled PEKK with the unused PEKK.

7. The process of claim 2, wherein the SLS process used to manufacture the three-dimensional object has a bed temperature between $T_{M2}$ and 20 degrees Celsius less than the $T_{M2}$ and has a laser with a power between 2 and 50 (W*s/mm^2); wherein an average in-plane tensile strength of the three-dimensional object is greater than an average in-plane tensile strength of a three-dimensional object manufactured by selective sintering using electromagnetic radiation from a powder consisting essentially of an unused PEKK powder, wherein the SLS process used to manufacture the three-dimensional object consisting essentially of the unused PEKK powder has a bed temperature between the melting point temperature of the unused PEKK powder and 20 degrees Celsius less than the melting point temperature of the unused PEKK and has a laser with a power between 2 and 50 (W*s/mm^2).

8. The process of claim 1, wherein an average in-plane tensile strength of the three-dimensional object is greater than 10 ksi,
wherein the SLS process used to manufacture the three-dimensional object has a bed temperature between $T_{M2}$ and 20 degrees Celsius less than the $T_{M2}$ and has a laser with a power between 2 and 50 (W*s/mm^2).

9. The process of claim 1, wherein the recycled PEKK consists essentially of first recycle PEKK;
wherein the first recycle PEKK is recycled PEKK that has been used previously in only one SLS process.

10. The process of claim 1, wherein the powder consists essentially of recycled PEKK.

11. The process of claim 2, wherein the powder consists essentially of one or more of first recycle PEKK and second recycle PEKK;
wherein the first recycle PEKK is recycled PEKK that has been used previously in only one SLS process;
wherein the second recycle PEKK is recycled PEKK that has been used previously in two SLS processes.

12. A layer-by-layer process for manufacturing a three-dimensional object from a powder comprising the steps of:
applying a layer of a powder on a bed of a laser sintering machine, the powder comprising recycled polyetherketoneketone (PEKK);
solidifying selected points of the applied layer of powder by irradiation;
successively repeating the step of applying the powder and the step of solidifying the applied layer of powder until all cross sections of a three-dimensional object are solidified;
wherein the recycled PEKK is a PEKK powder that has been previously used in an SLS process having a bed temperature between a melting point temperature of the PEKK powder before the SLS process ($T_{M1}$) and 20 degrees Celsius less than the $T_{M1}$ and having a laser with a power between 2 and 50 (W*s/mm^2);
wherein a melting point temperature of the recycled PEKK ($T_{M2}$) is greater than $T_{M1}$.

13. The process of claim 12, wherein a bed temperature of the powder comprising the recycled PEKK ($T_{Bed}$) is greater than a bed temperature for a powder consisting of a PEKK powder that has not been used in a selective laser sintering (SLS) process.

14. The process of claim 13, further comprising the step of:
maintaining the bed of the laser sintering machine at $T_{Bed}$, wherein $T_{Bed}$ is approximately 285 degrees Celsius or greater.

15. The process of claim 14, wherein the recycled PEKK powder is at least 50% of the powder by weight.

16. The process of claim 13, further comprising steps of preparing the recycled PEKK powder by:
applying a layer of a unused powder on a bed of a laser sintering machine, the unused powder comprising unused PEKK and excluding recycled PEKK;
subjecting the unused powder to a bed temperature between a melting point temperature of the unused powder before the SLS process ($T_{MV}$) and 20 degrees Celsius less than the $T_{MV}$;
solidifying selected points of the applied layer of unused powder by irradiation via a laser with a power between 2 and 50 (W*s/mm^2);
successively repeating the step of applying the unused powder and the step of solidifying the applied layer of unused powder until all cross sections of a three-dimensional object are solidified;
forming the recycled powder by collecting the unsolidified unused powder used in the successive steps of applying unused powder and solidifying unused powder.

17. The process of claim 13, wherein the SLS process used to manufacture the three-dimensional object has a bed temperature between $T_{M2}$ and 20 degrees Celsius less than the $T_{M2}$ and has a laser with a power between 2 and 50 (W*s/mm^2); wherein an average in-plane tensile strength of the three-dimensional object is greater than an average in-plane tensile strength of a three-dimensional object manufactured by selective sintering using electromagnetic radiation from a powder consisting essentially of an unused PEKK powder, wherein the SLS process used to manufacture the three-dimensional object consisting essentially of the unused PEKK powder has a bed temperature between the melting point temperature of the unused PEKK powder and 20 degrees Celsius less than the melting point temperature of the unused PEKK and has a laser with a power between 2 and 50 (W*s/mm^2).

* * * * *